Dec. 30, 1941.   A. H. SCHUTTE   2,268,534

LIQUID-SOLID SEPARATOR

Filed Nov. 1, 1939

INVENTOR
August Henry Schutte
BY Nathaniel Ely
ATTORNEY

Patented Dec. 30, 1941

2,268,534

UNITED STATES PATENT OFFICE 2,268,534

LIQUID-SOLID SEPARATOR

August Henry Schutte, Tuckahoe, N. Y.

Application November 1, 1939, Serial No. 302,277

4 Claims. (Cl. 233—15)

This invention relates to improvements in liquid-solid separation and more particularly to the construction of centrifugal separators for such purpose.

The separation of a solid from a liquid in which it is suspended is frequently accomplished in solid-bowl centrifugal clarifiers. The method of operation usually consists of feeding the slurry of liquid and solid into the clarifier until a sufficient cake has been formed therein and then removing the cake and washing it to complete the separation.

It has been impracticable to carry out the washing step while the cake is in situ as the wash liquid, which has a lower specific gravity than that of the cake, does not penetrate the cake but merely impinges on the cake surface and is thrown out over the rim of the clarifier bowl. If a wash liquid having a higher specific gravity than that of the cake is used, the cake is displaced and is forced out of the clarifier bowl. Consequently, if it is desired to wash the cake, it has been necessary to remove the cake from the clarifier, break it up, mix it with wash liquid, and then subject the slurry produced to another separating treatment. Such a process involves the use of more than one piece of apparatus and is discontinuous in nature.

One of the principal objects of my invention is to provide a solid-bowl centrifugal clarifier in which both the formation and the washing of the cake may be continuously, expeditiously, and effectively carried out in the machine.

Another and more specific object of my invention is to provide an improved solid-bowl centrifugal clarifier in which the wash liquid, released at a point adjacent the cake-forming wall, penetrates the cake in a direction opposite to that in which the centrifugal force is acting and displaces the retained mother liquor therein either by direct mass action or by dilution.

A still further object of my invention is to provide a solid-bowl centrifugal clarifier with a series of longitudinally extending wash pipes having longitudinally spaced openings adjacent to the cake-forming wall and so arranged that continuous washing of the cake and complete elimination of the mother liquor therefrom is obtained by the continuous penetration of the wash liquid through the cake in a direction opposite to that in which the centrifugal force is acting.

Further objects and advantages of this invention will appear from the following description thereof, taken in connection with the attached drawing, in which Fig. 1 is a vertical cross section through a type of solid-bowl centrifugal clarifier taken along the line 1—1 of Fig. 2;

Figure 1:
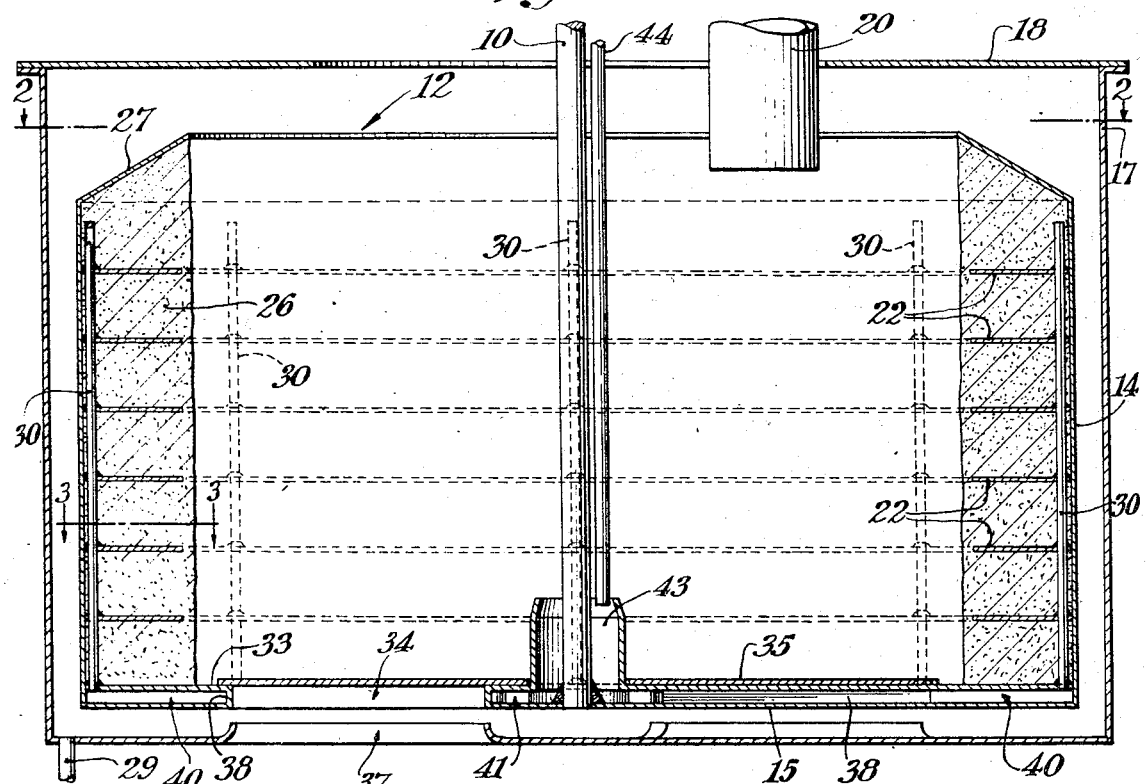

In accordance with a preferred form of embodiment of my invention, the liquid-solid separating device generally shown in Fig. 1 is intended to represent a solid-bowl centrifugal clarifier. This device is operated at a relatively high speed by a motor (not shown) which is adapted to rotate the shaft 10 carrying the clarifier bowl generally indicated at 12. This bowl consists of a side wall 14 and an end wall 15, both of which are preferably integral with each other. The bowl 12 is conveniently supported from above as by suitable means (not shown) and is thereby suspended in a housing 17 provided with a removable cover 18.

Figure 2:
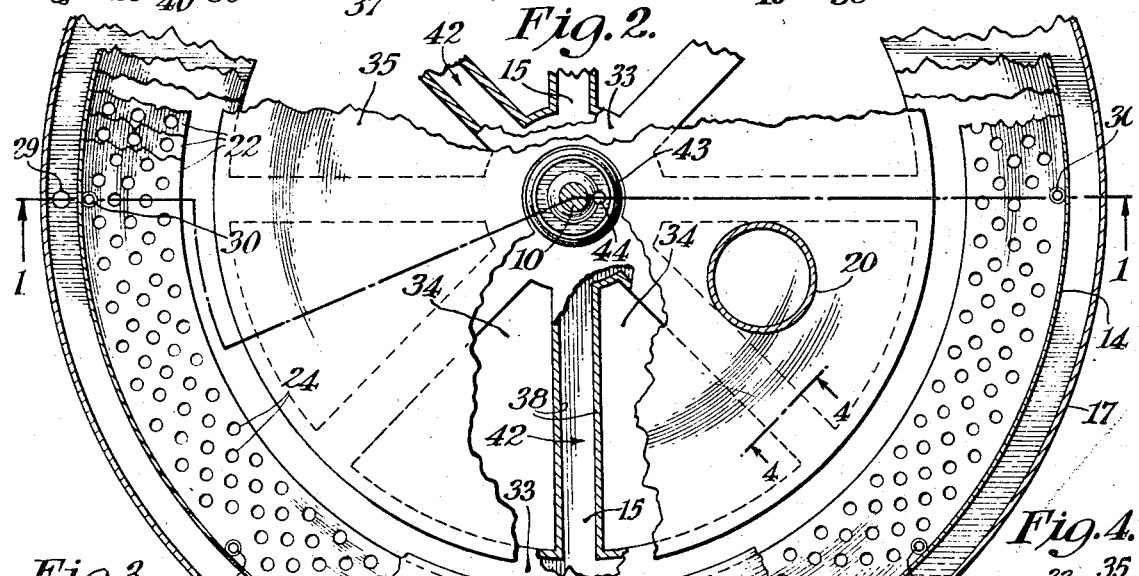
Fig. 2 is a horizontal cross section taken substantially along the line 2—2 of Fig. 1 with parts broken away to show the internal construction of the clarifier.

The clarifier normally receives a feed of slurry through the feed pipe 20, such feed suitably entering the central portion of the clarifier bowl, whence it is thrown outwardly toward the side wall 14 under the centrifugal effect due to the rotation of the bowl. The wall 14 is preferably provided with annular partitions 22, more particularly shown in Fig. 2, which serve to lock or hold the cake with respect to the wall 14 and which, by preventing a relative movement of the cake circumferentially with respect to this wall, prevent the cake from becoming off center. These partitions are perforated as at 24 so that the cake indicated at 26, which tends to accumulate on the end wall 15, will pass upwardly and cover the entire wall 14. It is to be understood that the mother liquor that is in the slurry and that is forced out of the cake passes over the cover 27 of the bowl 12 and is thrown outwardly against the housing 17 by the centrifugal force due to the rotation of the bowl. Liquid is discharged from the housing 17 through the outlet 29.

As the principal feature of my invention, I provide means to wash the cake while it is maintained in situ in the machine. Such means preferably include a series of wash pipes generally indicated at 30, of which there may be several, eight being shown in the present construction.

Figures 3, 4:
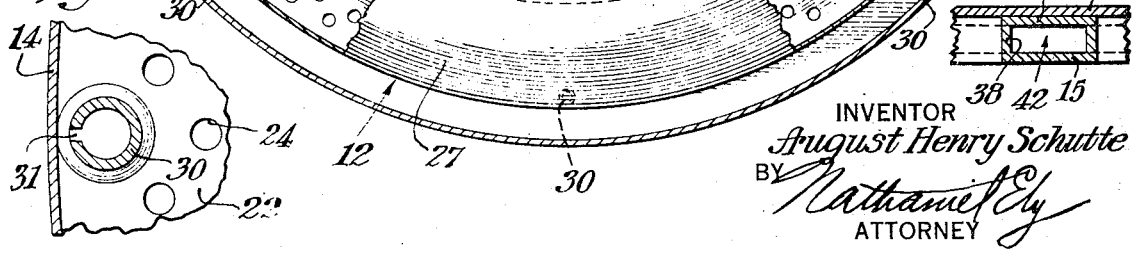
Fig. 3 is an enlarged cross sectional detail taken substantially along the line 3—3 of Fig. 1.
Fig. 4 is an enlarged cross sectional view of a portion of the clarifier taken along the line 4—4 of Fig. 2.

These wash pipes are substantially cylindrical conduits closed at the top and open at the bottom and provided with longitudinally spaced openings or a continuous slit 31 as shown in Fig. 3 for the distribution of wash liquid through the cake. The pipes are so arranged that the openings are adjacent to and face the wall 14.

It will be seen that with this arrangement it is substantially impossible for the cake to pack the openings of the wash pipes during its formation. The cake, being heavier than the mother liquor, is thrown outwardly under the influence of the centrifugal force and moves only in this direction. In this manner, the mother liquor, being lighter than the cake, is displaced radially inward; and a portion of this displaced mother liquor is thus forced into the wash pipes 30, where it remains while the cake is being formed. When wash liquid is passed into the wash pipes 30, it is forced out into the cake by the displacement action caused by the continuous feeding of wash liquid to the wash pipes under centrifugal force. The wash liquid penetrates the cake in a direction opposite to that in which the centrifugal force acts and displaces the remaining mother liquor from the cake. Both the wash liquid and the mother liquor are displaced over the edge of cover 27 because of the excessive centrifugal force on the wash liquid since the maximum head before overflow is the depth of the cover 27 and the displacing pressure is determined by the total feed head, which can be made considerably greater.

If the wash liquid is a non-solvent for the mother liquor, the displacement of the mother liquor is direct. The color or a similar quality of the liquid discharge is then an indication of the extent to which the cake has been washed. In a similar manner, a wash liquid that is a solvent for the mother liquor causes a dilution of the mother liquor. The extent of dilution is then a positive indication of the extent of washing.

The wash liquid is conveniently introduced to conduits 30 through passageways formed, as will hereinafter be described, by placing a false end wall 33 over end wall 15. Both end walls may contain a plurality of corresponding openings 34 for the discharge of the final cake from the clarifier bowl. During the formation of the cake, openings 34 are closed by a removable cover 35, annular in shape. The enclosure 17 also has a plurality of openings 37 to correspond to openings 34. Partitions 38, provided to close off the space between the end walls, form conduits 42 for the centrifugal distribution of wash liquid.

Openings 34 divide the space between the two end walls into two annular fluid chambers 40 and 41 and a plurality of radially extending conduits or channels 42. Fluid chamber 41 is adapted to receive wash liquid from a wash receiving collar 43, into which the wash liquid flows through pipe 44. The wash liquid is thrown outwardly by centrifugal force from receiver 43 and fluid chamber 41 through channels 42 to fluid chamber 40, whence it flows upwardly through pipes 30. It will, of course, be understood that other means may be provided to interconnect the pipes 30 with the central source of inflowing wash liquid.

In operation, the slurry is fed into the clarifier at the desired rate so that a cake is built up along the side wall and the mother liquor is forced out and over the top of the clarifier bowl. Wash liquid is then introduced for such a period until the liquid passing over the upper edge of the clarifier bowl indicates that the washing is substantially completed. Cover 35 is then removed and the cake is scraped from the bowl and discharged by any suitable means such as a knife, the details of which are not shown. Substantially complete separation is accomplished, and such cake need not ordinarily be repulped. The formation of washed cake can be accomplished with no appreciable delay and with a single operation on one machine; power as well as time requirements are reduced to a minimum.

While I have shown a preferred form of embodiment of my invention, I am aware that modification may be made thereto, and I, therefore, desire a broad interpretation of my invention within the scope and spirit of the description herein and of the claims appended hereinafter.

I claim:

1. A liquid-solid separator of the class described which comprises a bowl having a side wall and inwardly extending end walls, means to rotate said bowl, means to feed a slurry to said bowl whereby a cake is formed on said side wall to the depth of one of said end walls, a plurality of wash liquid conduits extending along said side wall parallel to the axis of rotation and closely adjacent said side wall and normally embedded in the cake thereon, means to feed a wash liquid to said conduits to wash said cake in situ, said conduits having openings facing the side wall whereby the wash liquid can penetrate the cake radially inward and the cake can not penetrate the wash conduits.

2. A liquid-solid separator of the class described which comprises a bowl having an imperforate side wall and inwardly extending end walls, means to rotate said bowl, means to feed a slurry to said bowl whereby a cake is formed on said side wall to the depth of one of said end walls, a plurality of wash liquid conduits extending along said side wall parallel to the axis of rotation and spaced radially inwardly from the side wall at a distance such that the cake surrounds the conduits, means to feed a wash liquid to said conduits to wash said cake in situ, said conduits having openings facing radially outward whereby the wash liquid can penetrate the cake radially inward and the cake can not penetrate the wash conduits.

3. A liquid-solid separator of the class described which comprises a bowl having an imperforate side wall and inwardly extending end walls, means to rotate said bowl, means to feed a slurry to said bowl whereby a cake is formed on said side wall to the depth of one of said end walls, a plurality of wash liquid conduits extending along said side wall parallel to the axis of rotation and spaced radially inwardly from the side wall at a distance such that the cake surrounds the conduits, means to feed a wash liquid to said conduits to wash said cake in situ, said conduits having openings facing radially outward whereby the wash liquid can penetrate the cake radially inward and the cake can not penetrate the wash conduits, said conduits being imperforate at one end, the opening in each conduit being a continuous slit along its length for uniform distribution of wash liquid through the cake.

4. A liquid-solid separator of the class described which comprises a bowl having a side wall and inwardly extending end walls, means to rotate said bowl, means to feed a slurry to said bowl whereby a cake is formed on said side wall to the depth of one of said end walls, a plurality of wash liquid conduits extending along said side wall parallel to the axis of rotation and closely adjacent said side wall and normally embedded in the cake thereon, means to feed a wash liquid to said conduits to wash said cake in situ, said conduits having openings facing the side wall whereby the wash liquid can penetrate the cake radially inward and the cake can not penetrate the wash conduits, the other end wall of said bowl having openings therein, means to close said openings during cake formation, said other end wall having radially extending conduits formed by partitions in said openings, said radially extending conduits serving to conduct wash liquid to said wash liquid conduits.

AUGUST HENRY SCHUTTE.